United States Patent [19]

Rüger

[11] Patent Number: 4,694,333

[45] Date of Patent: Sep. 15, 1987

[54] PHOTOELECTRIC RECEIVER WITH LOCAL BRIGHTNESS ADAPTATION

[75] Inventor: Roderich Rüger, Munich, Fed. Rep. of Germany

[73] Assignee: Messerschmitt-Bölkow-Blohm GmbH, Munich, Fed. Rep. of Germany

[21] Appl. No.: 777,840

[22] Filed: Sep. 19, 1985

[30] Foreign Application Priority Data

Sep. 25, 1984 [DE] Fed. Rep. of Germany ....... 3435064

[51] Int. Cl.⁴ .................................. H01J 31/49
[52] U.S. Cl. ................................ 358/113; 250/332; 250/334
[58] Field of Search ............ 358/212, 113, 209, 213; 250/332, 334, 578, 211 R, 211 J

[56] References Cited

U.S. PATENT DOCUMENTS 4,072,863  2/1978  Roundy ........................ 358/113 X
4,158,137  6/1979  Menke ........................... 250/334 X

FOREIGN PATENT DOCUMENTS 104226  6/1985  Japan ........................... 250/211 R

OTHER PUBLICATIONS

"Natur und Wissenschaft" from Frankfurter Allgemeine Zeitung of Jun. 18, 1975, No. 137, p. 1.

Primary Examiner—L. T. Hix
Assistant Examiner—D. Rutledge
Attorney, Agent, or Firm—Kenyon & Kenyon

[57] ABSTRACT

A photoelectric receiver for picture recording equipment, particularly for thermal-image equipment having local brightness adaptation, comprises at least one first detector element for providing point-by-point scanning of the image generated by an optical receiving system, as well as at least one second detector element associated with one or several of the first detector element(s) having a larger radiation-sensitive area for picking up at least part of the surroundings of a picture point picked up by a first detector element. The second detector element determines the gain, with which the signals of the first detector element(s) are amplified for the formation of video signals.

6 Claims, 4 Drawing Figures

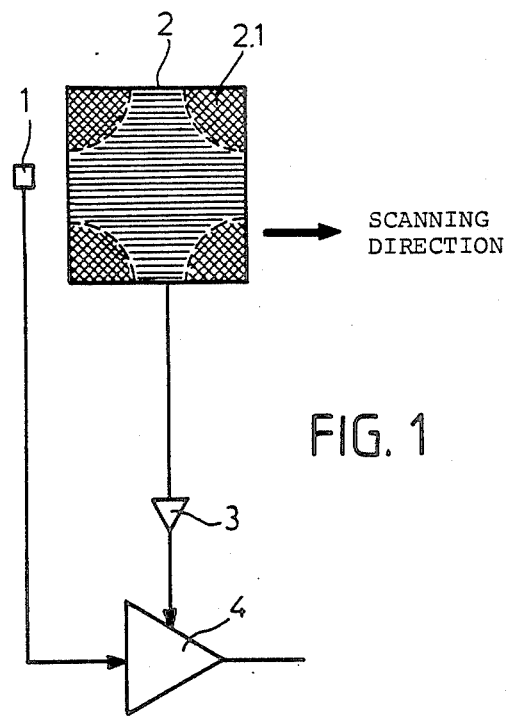
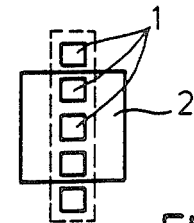
FIG. 1
FIG. 2
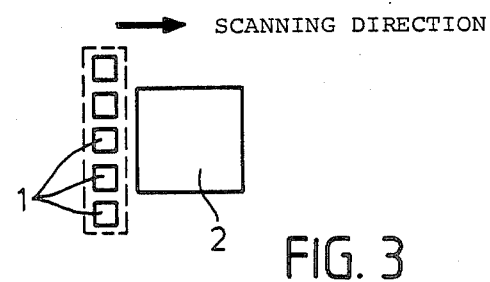
FIG. 3
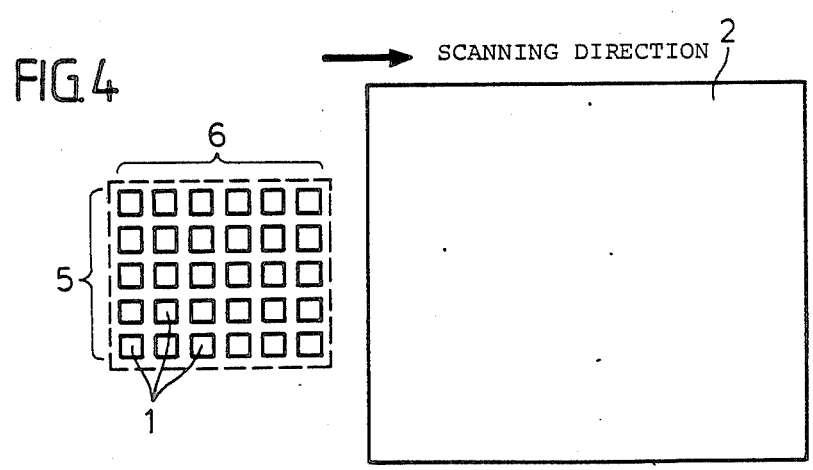
FIG. 4

PHOTOELECTRIC RECEIVER WITH LOCAL BRIGHTNESS ADAPTATION

BACKGROUND OF THE INVENTION

The present invention relates to a photoelectric receiver for camera equipment, especially for thermal-image equipment with local brightness adaptation, as well as to a method for local brightness adaptation.

From "Frankfurter Allgemeine Zeitung" of June 18, 1975, No. 137, an apparatus and method for the local brightness adaptation for television recording is known; see page 1 of the column "Natur und Wissenschaft". For this purpose, the picture is recorded by two cameras which scan the picture synchronously. The one of the two cameras is adjusted out-of-focus so that its signal corresponds to the average brightness of a small disc from the surroundings of the picture point proper. In special equipment, not described in detail, the signals of the two cameras are electronically compared, so that the brightness scale is adapted point by point to the prevailing illumination conditions. The contrast between two adjacent picture elements is thereby preserved without change, but, for instance, the dark portions of a scene can be emphasized in this manner over the brightly illuminated ones and be made visible more clearly. Overall, an increase of the dynamics is therefore achieved in the taking of pictures.

Since this method requires two complete picture pickup devices (e.g.: TV cameras), it is correspondingly expensive. Even more expensive would be such a method for thermal imaging equipment, the detectors of which require separate cooling devices.

SUMMARY OF THE INVENTION

It is therefore an object of the present invention to provide a photoelectric receiver for picture recording equipment, particularly thermal imaging equipment with local brightness adaptation, in which a substantially smaller amount of apparatus is sufficient.

The above and other objects of the present invention are achieved by a photoelectric receiver for camera picture pickup equipment, particularly for thermal-image equipment having local brightness adaptation, comprising at least a first detector means for providing point-by-point scanning of the picture generated by an optical receiving system, and at least one second detector means associated with the first detector means having a larger radiation-sensitive area for picking up at least part of the surroundings of a picture point picked up by the first detector means.

The objects of the present invention are also achieved by a method for local brightness adaptation in a photoelectric receiver.

The photoelectric receiver and the method for local brightness adaptation require only one optical receiving system and, in the case of thermal image equipment, also only one cooling device, since the first and second detector means can be arranged in the same cooling vessel. It is furthermore possible to realize the so-called neighborhood operations for picture enhancement, which are otherwise connected with a considerable amount of electronic computing equipment, in a simple optical manner in that the second detector means is provided with a radiation-impervious or partially transparent mask or aperture, by which the radiation sensitivity of the detector surface can be changed locally.

BRIEF DESCRIPTION OF THE DRAWINGS

The invention will be explained in greater detail in the following detailed description with reference to the drawings, in which:

FIG. 1 shows a photoelectric receiver having a circuit for local brightness adaptation;

FIG. 2 shows a row of first detector elements with a second detector element arranged symmetrically to the center;

FIG. 3 shows a row of first detector elements with a second detector element arranged ahead thereof in the scanning direction; and FIG. 4 shows an array of first detector elements with a large-area second detector element arranged ahead thereof in the scanning direction.

DETAILED DESCRIPTION

With reference now to the drawings, in the example shown in FIG. 1, there are located in the picture plane of an optical input system, not shown, having a scanning device known per se, which is likewise not shown, side by side a first detector element 1 as well as a second detector element 2 arranged ahead thereof in the scanning direction, which are sensitive in the same spectral range of interest and which are called in the following "detector" for short. For recording infrared radiation, the two detectors designed accordingly may be arranged side-by-side in the same cooling vessel. The first detector 1 serves for the point-wise scanning of the picture and is as small as possible for generating high-resolution pictures. The second detector 2 is to pick up integrally primarily the environment of the picture point covered by the detector 1. The signals of the detector 2 are amplified in a preamplifier 3 and serve, optionally with time delay, for controlling the gain of a video amplifier 4 which amplifies the signals of the detector element 1. At the output of the video amplifier 4 are then present the video signals which can be used for display or, optionally, further processing. The gain is controlled in the sense of a local brightness adaptation in such a manner that, for instance, for a bright environment of an image point, i.e., for a correspondingly large signal of detector 2, the gain of the signal of detector 1 is reduced and vice versa. The characteristic by which the gain is changed depends on the preamplifier or the video amplifier and can take place, for instance, linearly, exponentially or in another suitable manner.

From methods for picture enhancement by so-called neighborhood operations, it is known to weigh the closest surroundings of an image point differently from further removed regions. This can be realized very simply by the provision that the detector 2 has on its detector surface a mask 2.1 which has locally different transparencies for the radiation to be received. In the example shown, the corners of the square detector should have a transparency different from that of the central region. Other, for instance, concentric arrangements can be realized in the same manner. Instead of the mask with a fixed shape of the local transparency differences, also a liquid crystal aperture, for instance, designed in the form of a matrix, can be arranged in front of the detector 2, the matrix elements of which can be switched electrically to transmission or absorption.

FIG. 2 shows a row of first detector elements 1 for picture scanning, wherein the second detector element 2 is arranged for the brightness control of the entire row, symmetrically to the center of the row. This arrangement can be realized, for instance, by the provision that behind the optical receiving system or the scanning device, a beam splitter is arranged, in the output ray paths of which the detector row and the large-area second detector 2 are arranged separately side-by-side, symmetrically to the respective optical axis.

Another arrangement of a detector row comprising first detector element 1 and a second detector element 2 arranged ahead thereof in the scanning direction of a scanning device, not shown, is shown in FIG. 3. The control signals coming from the detector element 2 for the brightness control of the detector row would then come to the corresponding picture signals of the detector row shifted in time. With correspondingly high scanning rates and short distances between the first and second detector elements, this may be inconsequential; however, a real-time correction for the brightness control can be realized also by time delay stages for the control signals.

A further arrangement of first and second detector elements is shown in FIG. 4. Here, the first detector elements 1 form an array of, for instance, 5×6 elements which scan a picture by means of a scanning device, not shown (so-called "parallel-serial scanning"). The detector elements 1 of the entire array are controlled by a second detector element 2 arranged ahead thereof in the scanning direction in the manner described in conjunction with FIG. 1

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A photoelectric receiver for camera picture pickup equipment, particularly for thermal-image equipment having local brightness adaptation, comprising at least first detector means for providing point-by-point scanning of the picture generated by one optical receiving system, and at least one second detector means associated with said first detector means having a larger radiation-sensitive area for picking up at least part of the surroundings of a picture point picked up by the first detector means, said second detector means being arranged adjacent said first detector means, and further comprising amplifier means coupled to an output of said first detector means for providing gain to an output signal from the first detector means, an output signal of said second detector means controlling the gain of said amplifier means.

2. The photoelectric receiver recited in claim 1, wherein said first detector means comprises a row or an array of first detector elements for providing scanning of a picture in parallel and serial format, and wherein said second detector means comprises means for picking up at least part of the picture portion picked up by said row or array.

3. The photoelectric receiver recited in claim 1, wherein the second detector means comprises a radiation impervious mask or aperture, by means of which the radiation sensitive detector area can be changed.

4. The photoelectric receiver recited in claim 1, wherein the second detector means has at least one mask or aperture with a given transmission such that the radiation sensitivity of the detector area can be changed locally.

5. The photoelectric receiver recited in claim 3, wherein the mask or aperture comprises an electrically controlled liquid crystal.

6. A method for local brightness adaptation of a photoelectric receiver for camera picture pickup equipment, particularly for thermal-image equipment, the receiver having first detector means for providing point-by-point scanning of the picture generated by an optical receiving system, and second detector means associated with said first detector means having a larger radiation sensitive area for picking up at least part of the surroundings of a picture point picked up by the first means, the method comprising the step of determining, with said second detector means, a gain with which the signals of the first detector means are amplified for the formation of video signals.

* * * * *